United States Patent
Agrawal et al.

(10) Patent No.: US 12,175,423 B2
(45) Date of Patent: Dec. 24, 2024

(54) REDISTRIBUTING PRODUCT INVENTORY

(71) Applicant: Oracle International Corporation, Redwood Shores, CA (US)

(72) Inventors: Jayesh Govindlal Agrawal, Hyderabad (IN); Moshin Lee, Lake Oswego, OR (US); Mukundan Srinivasan, Union City, CA (US); Vishwajit Manohar Bhave, Colleyville, TX (US); Garrett Dale Glover, Aurora, CO (US); Purushotham Abram, Fremont, CA (US); Wei Xia, Ontario (CA); Sendilkumar Ayyaswamy, Telangana (IN)

(73) Assignee: Oracle International Corporation, Redwood Shores, CA (US)

( * ) Notice: Subject to any disclaimer, the term of this patent is extended or adjusted under 35 U.S.C. 154(b) by 253 days.

(21) Appl. No.: 17/710,428

(22) Filed: Mar. 31, 2022

(65) Prior Publication Data
US 2023/0316219 A1    Oct. 5, 2023

(51) Int. Cl.
*G06Q 10/087* (2023.01)
*G06Q 10/08* (2024.01)

(52) U.S. Cl.
CPC ........... *G06Q 10/087* (2013.01); *G06Q 10/08* (2013.01)

(58) Field of Classification Search
CPC .............................. G06Q 10/08; G06Q 10/087
See application file for complete search history.

(56) References Cited

U.S. PATENT DOCUMENTS

| | | | |
|---|---|---|---|
| 6,681,990 B2 | 1/2004 | Vogler et al. | |
| 8,504,406 B2 | 8/2013 | Miller et al. | |
| 10,956,865 B1 | 3/2021 | Kim | |
| 11,276,081 B1 * | 3/2022 | Lamb | G06Q 30/0261 |

(Continued)

OTHER PUBLICATIONS

Atima Ezzahra Achamrah, Fouad Riane &Sabine Limbourg, "Solving inventory routing with transshipment and substitution under dynamic and stochastic demands using genetic algorithm and deep reinforcement learning", Oct. 19, 2021, International Journal of Production Research, vol. 60, 2022—Issue 20 (Year: 2022).*

(Continued)

*Primary Examiner* — Allen C Chein
(74) *Attorney, Agent, or Firm* — Invoke

(57) ABSTRACT

Techniques for generating recommendations for redistributing product inventories are disclosed. A product redistribution system applies hierarchal prioritization of product locations to generate a plan for redistributing products among the product locations. A system identified product repositories organized into clusters. A product redistribution plan first redistributes products among repositories within a cluster. Then the system redistributes products between different clusters. A system predicts whether repositories have excess products or product shortages by applying product excess windows and product shortage windows to inventory data. The system predicts supply and demand of a product over a period of time including the product supply window and the product shortage window. The system generates the product redistribution plan based on the predicted product excess predictions and product shortage predictions.

20 Claims, 8 Drawing Sheets

(56) References Cited

U.S. PATENT DOCUMENTS

| | | | |
|---|---|---|---|
| 2009/0313090 A1 | 12/2009 | Armstrong et al. | |
| 2018/0218312 A1 | 8/2018 | Smith et al. | |
| 2020/0320467 A1* | 10/2020 | Wu | G06Q 10/087 |
| 2022/0067657 A1* | 3/2022 | Neumann | G06N 20/00 |

OTHER PUBLICATIONS

You, Peng Sheng, "An artificial intelligent approach to the bicycle repositioning problems", 2017 (Year: 2017).*

Deniz Türsel, "Supply Chain Management in Apparel Industry: A Transshipment Problem With Time Constraints", 2011 (Year: 2011).*

"Frepple—Inventory rebalancing," Retrieved at https://frepple.org/docs/6.1/user-guide/cookbook/distribution/inventory-rebalancing.php, Retrieved on Apr. 2022, pp. 3.

"Inventory balancing—SAP," Retrieved at https://help.sap.com/saphelp_SCM700_ehp02/helpdata/en/47/9f236ebfe51596e10000000a42189d/frameset.htm, Retrieved on Apr. 2022, p. 1.

"Retaon—Inventory tranfers and balancing," Retrieved at https://retalon.com/blog/inventory-balancing, Retrieved on Apr. 2022, pp. 11.

Agrawal V. et al., "Dynamic balancing of inventory in supply chains," European Journal of Operational Research, vol. 159, 2004, pp. 296-317.

Benjaafar S. et al., "Dynamic Inventory Repositioning in On-Demand Rental Networks," Management Science, 2022, pp. 58.

Cheung K.L. et al., "The Inventory Benefit of Shipment Coordination and Stock Rebalancing in a Supply Chain," Management Science, vol. 48. Issue 2, 2002, pp. 300-306.

Meissner J. et al., "Approximate dynamic programming for lateral transshipment problems in multi-location inventory systems," European Journal of Operational Research, vol. 265, Issue 1, Feb. 16, 2018, pp. 49-64.

* cited by examiner

REDISTRIBUTING PRODUCT INVENTORY

TECHNICAL FIELD

The present disclosure relates to generating a plan to redistribute a product among multiple product repositories. In particular, the present disclosure relates to applying a machine learning model to product inventory data to generate a plan for redistributing the product.

BACKGROUND

In industries characterized by extensive parts distribution networks such as retail, consumer packaged goods, and service parts distribution, changing supply and demand leads to some locations having excess products while other retail locations have shortages. Demand may vary by unforeseen events, seasons, and locations. Excess inventory leads to an increase in storage costs. For example, the cost to simply maintain a facility—with rent, mortgage, and utilities—means any excess product that cannot be sold is costing a company money. Conversely, when a retail location has a product shortage, a company loses money as a result of lost sales and goodwill as a result of not meeting agreed-upon service level targets.

Companies attempt to predict supply and demand to match the right number of products with each location. However, inevitably some locations are left with excess inventory while others run out of products.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
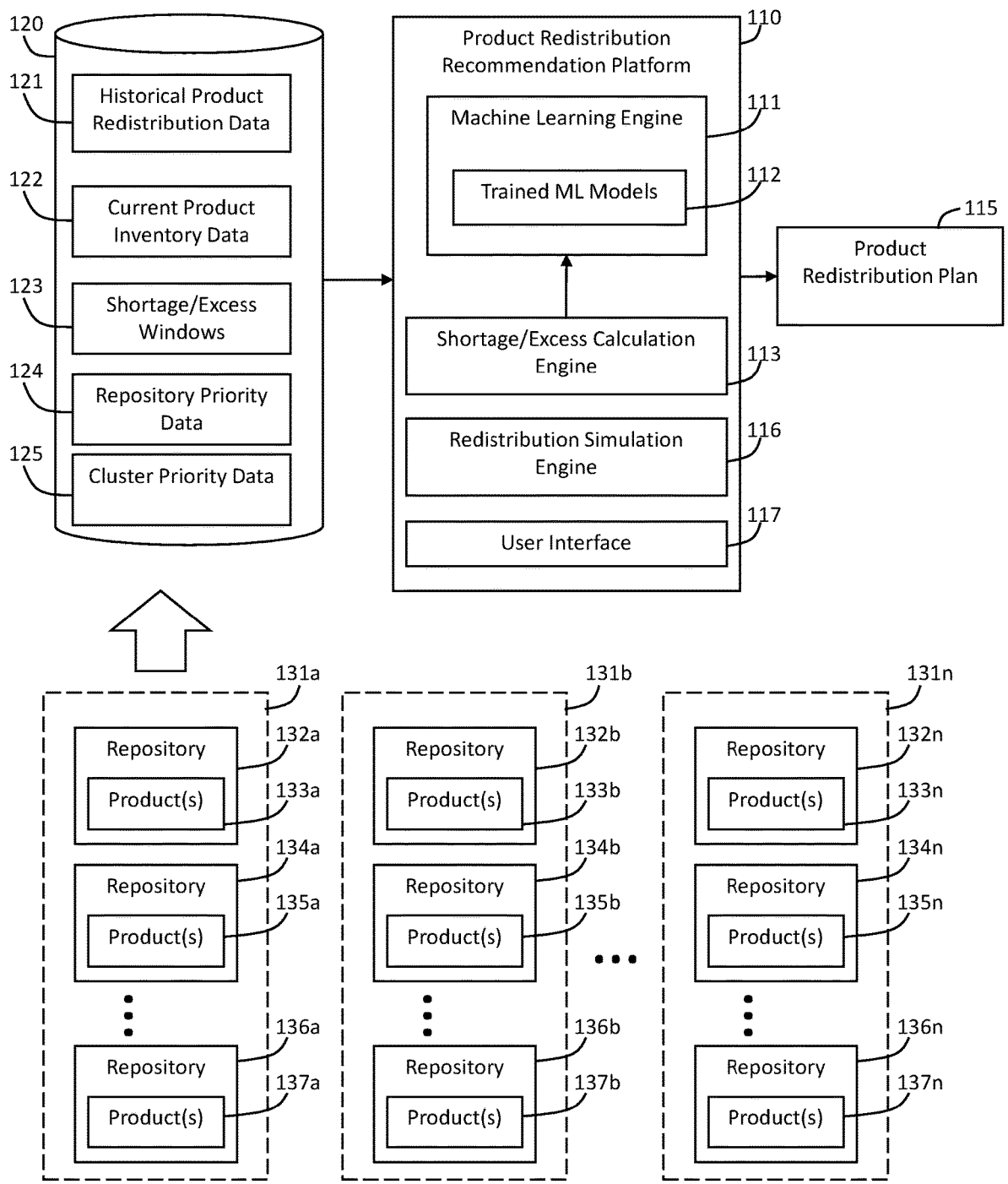
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. GENERATING RECOMMENDED PRODUCT REDISTRIBUTION PLAN
4. MACHINE LEARNING MODEL TRAINING
5. SIMULATING PRODUCT REDISTRIBUTION WITHIN A PRODUCT INVENTORY NETWORK
6. HIERARCHY-BASED PRODUCT REDISTRIBUTION
7. EXAMPLE EMBODIMENT
8. COMPUTER NETWORKS AND CLOUD NETWORKS
9. MISCELLANEOUS; EXTENSIONS
10. HARDWARE OVERVIEW

1. General Overview

A product redistribution system applies hierarchal prioritization of product locations to generate a plan for redistributing products among the product locations.

One or more embodiments organize product repositories into clusters to redistribute products within the cluster. Product repositories include, for example, a storefront that stores and sells a product or a warehouse that stores a product. Additional product repositories include supply storage closets or rooms at a business, such as a hospital, product servicing locations, vehicle maintenance bays, food product storage structures, such as grain silos, and resource production and storage structures such as oil rigs. Different repositories may be clustered together based on measurable criteria, such as the time it takes to transport a product between the repositories. Alternatively, clusters may be organized based on geographical boundaries or organizational boundaries of a business enterprise. A system detects a trigger to initiate product redistribution. For example, the system may detect a low inventory at one location. Alternatively, the system may perform a regularly-scheduled product redistribution. The system generates a redistribution plan based on a priority hierarchy. The system initially predicts product shortages and excesses for repositories within a cluster. The system generates a plan to redistribute products among the repositories within the cluster based on priority values associated with the repositories. For example, if two repositories in the same cluster have an inventory shortage, the system transfers excess product from a repository having an excess of products to the repository with the higher priority, among the two repositories having product shortages. Priority values may be assigned by users. Alternatively, priority values may be calculated based on other characteristics. For example, the system may include a rule that a repository having a more severe product shortage has a higher priority value than a repository having a lesser product shortage. The system generates redistribution plans for each cluster in a network of product inventory clusters. The system next transfers excess products from one cluster having an excess to another cluster having a shortage. The system selects which clusters are to transmit and receive excess products based on cluster priority values.

The system may select a methodology for transferring excess products between clusters by modeling a higher-level cluster made up of sub-clusters. For example, if a Canada cluster consists of Vancouver, Calgary, and Toronto, and a U.S. cluster consists of Seattle, St. Louis, and Boston, then a North America cluster may consist of Calgary and St. Louis. The system may configure cluster priorities such that the Canada and U.S. clusters are rebalanced before the North America cluster is rebalanced. If Calgary and St. Louis are set as "sweep" locations of the Canada and U.S. clusters respectively (i.e., locations to which the remaining excesses within a cluster are moved and consolidated after rebalancing), at the end of the rebalancing process for Canada and U.S., Calgary would hold all of the remaining excesses of the Canada cluster and St. Louis would hold all of the remaining excesses of the U.S. cluster. When the North America cluster consisting of the sweep locations Calgary and St. Louis is itself finally rebalanced after the rebalancing of Canada and the U.S., the rebalancing of North America will achieve the higher level rebalancing between the Canada and the U.S. clusters.

One or more embodiments apply a machine learning model to generate a product redistribution plan. The system trains the machine learning model based on historical inventory attributes, historical redistribution plans, historical scores associated with the historical redistribution plans, historical excesses, and historical shortages. The machine learning model learns relationships among product distribution attributes and particular scores. For example, the machine learning model may learn that product redistributions associated with lower product transfer times, higher profits, and fewer product shortages are associated with higher product redistribution scores. The system may provide for supervised training of the machine learning model to allow a user to indicate product redistribution plans that are preferred over others. The system may train the machine learning model to associate particular rules with higher product redistribution scores. For example, the machine learning model may learn the redistributions of products within a product repository cluster are associated with higher scores than transferring products between clusters. The system trains the model to learn the rules by associating higher scores with data points that comply with the rules. Upon training the machine learning model, the system applies a set of inventory data to the machine learning model to generate a recommended product redistribution plan for a particular product inventory network.

One or more embodiments calculate excess product and product shortages using adjustable excess product/product shortage windows. A window represents a period of time extending from an initial time, such a current time, into the future. For example, a window of three days may extend from an initial day and include two additional days in the future. The system predicts whether product repositories will have excesses or shortages based on the product excess/shortage windows. The system calculates an excess at each day of the product excess window. The system calculates the shortage at the end of the product shortage window. For example, if the product excess window is three days, the system predicts whether a repository will have an excess at the end of the third day. The excess product/product shortage windows may be based on a time required to transfer a product from one location to another. Each cluster of product repositories may be associated with a different product excess window and/or product shortage window.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes a product redistribution recommendation platform 110, a data repository 120, and a plurality of clusters 131a-131n of product repositories 132a-132n, 134a-134n, and 136a-136n. The product redistribution recommendation platform 110 obtains current product inventory data 122 and analyzes the data to generate a plan for redistributing one or more products among the product repositories 132a-132n, 134a-134n, and 136a-136n. Product repositories may include, for example, brick-and-mortar sales sites that stock products, and into which customers may enter to purchase the products. Product repositories may also include, for example, warehouses or production facilities.

In one or more embodiments, the product redistribution recommendation platform 110 includes a product shortage/product excess calculation engine 113. The product shortage/product excess calculation engine 113 obtains the current product inventory data 122 and product shortage windows and product excess windows 123 and calculates, for each product repository and for each cluster, excess-product values and product shortage values. A product shortage window specifies a window extending from a current time into the future. A product shortage calculation predicts whether a particular repository will have a product shortage at a time immediately beyond the product shortage windows. For example, if a product shortage window is three days, the current inventory data may correspond to "day 1." The product shortage/product excess calculation engine 113 predicts future supply and demand for the product extending from "day 1" to "day 2," "day 3," "day 4," and beyond. The product shortage/product excess calculation engine 113 predicts a product shortage if the product inventory value at "day 4," or the increment of time immediately beyond the product shortage window, is less than a threshold value. Similarly, if a product excess window is one week, the product shortage/product excess calculation engine 113 predicts a product excess if the product inventory value at day 8 exceeds a threshold value. Alternatively, the product shortage/product excess calculation engine 113 predicts a product excess if the product inventory value at day 7 exceeds the threshold value.

In one or more embodiments, the product redistribution recommendation platform 110 includes a machine learning engine 111. The machine learning engine 111 includes hardware programmed to train one or more machine learning models 112. For example, the machine learning engine may train one machine learning model to predict the supply and/or demand of one or more products. The machine learning model is trained to receive product inventory data such as current inventory levels, inventory levels of the recent past, a current date, and product price levels, to generate a prediction of future supply and demand for a particular product. According to one embodiment, the product shortage/product excess calculation engine 113 obtains product supply/demand predictions from the trained machine learning model 112 trained to predict product supply and demand. A trained machine learning model 112 may recognize inventory trends, such as a rate of decrease of an inventory, over specified period of time. According to one embodiment, the machine learning engine 111 trains a machine learning model 112 to recognize seasonal patterns in inventory. For example, the machine learning model 112 may learn that, for a sample taken at a particular week of the year, a product inventory of 5 products is likely to run out in one week. The machine learning model 112 may learn that, for a sample taken at another particular week of the year, a product inventory of 5 products is likely to last three weeks. Accordingly, the current product inventory data 122 may include temporal data, such as a date. Another machine learning model 112 may receive as an input the generated seasonal supply/demand predictions to generate different plans 115, for the same inventory data representing numbers of products at respective product repositories, based on the date associated with the input current product inventory data 122.

In one or more embodiments, the trained machine learning models 112 include one machine learning model to predict product supply and demand, and another machine learning model to generate a plan 115 for redistributing one or more products. The machine learning engine 111 obtains historical product redistribution data 121 from the data repository 120. The historical product redistribution data 121 includes, for example: a time to redistribute a product between two or more of the product repositories, a cost to redistribute the product between the two or more of the product repositories, a reliability of an estimate for the time or the cost to redistribute the product between the two or more of the product repositories, a rate of reduction of supply of the product among the plurality of product repositories, and an interval of resupply of the product among the plurality of product repositories. The historical product redistribution data 121 may also include, for a particular set of distribution characteristics, a score for the set of historical product redistribution data. The score may be a computer-generated score based on predetermined criteria. The criteria may include, for example: a redistribution of products that results in the fewest product shortages among product repositories; a redistribution of products that results in the fewest product shortages among product vendors; a least expensive redistribution of products; a redistribution of products achieved within a predetermined time period; or any redistribution of products that complies with a formula balancing shortages, cost to redistribute, and any other criteria. According to an alternative example embodiment, the score may be generated or modified by a human based on the above criteria or any other criteria.

A trained machine learning model 112 trained to generate a product redistribution plan 115 obtains current product inventory data 122 and generates a plan 115 for distributing one or more products among the product repositories based on the current product inventory data 122. The product redistribution recommendation platform 110 may generate the plan 115 by applying a trained machine learning model 112 to product excess/product shortage data generated by the product shortage/product excess calculation engine 113. The machine learning model 112 may also receive as input data priority data 124 associated with repositories within clusters, as well as priority data 125 associated with different clusters. The trained machine learning model 112 may generate a product redistribution plan 115 based on the input data.

The historical product redistribution data 121 and the current product inventory data 122 describe inventory characteristics of products 133a-133n, 135a-135n, and 137a-137n among a plurality of product repositories 132a-132n, 134a-134n, and 136a-136n. The products may include one product or a plurality of different products. The historical product redistribution data 121 and the current product inventory data 122 may include information regarding relationships among products. For example, one product may function as a substitute for another product. If one product has a low inventory level, a distributer may provide another product to a product repository to resupply the low product. According to another example, two or more products may be complements of each other. If one of the products in a complementary set of products has a low inventory level, it may correlate to potential lost future sales of both products, rather than just the one product with a low inventory level. According to yet another example, one product may supersede another product. For example, a newer version of a product may supersede an older version of the product. An older version of the product may be provided as a substitute for a newer version when a shortage of the newer version is detected.

In one or more embodiments, a data repository 120 is any type of storage unit and/or device (e.g., a file system, database, collection of tables, or any other storage mechanism) for storing data. Further, a data repository 120 may include multiple different storage units and/or devices. The multiple different storage units and/or devices may or may not be of the same type or located at the same physical site. Further, a data repository 120 may be implemented or may execute on the same computing system as the product redistribution recommendation platform 110. Alternatively, or additionally, a data repository 120 may be implemented or executed on a computing system separate from the product redistribution recommendation platform 110. A data repository 120 may be communicatively coupled to the product redistribution recommendation platform 110 via a direct connection or via a network.

Information describing product redistribution data 121, current product inventory data 122, product shortage/product excess windows 123, repository priority data 124, and cluster priority data 125 may be implemented across any of components within the system 100. However, this information is illustrated within the data repository 120 for purposes of clarity and explanation.

According to one or more embodiments, the system organizes the product repositories 132a-132n, 134a-134n, and 136a-136n into clusters 131a-131n. The product redistribution recommendation platform 110 may assign each cluster 131a-131n with a different redistribution strategy, including different redistribution priorities and a different time window for determining whether and how to initiate redistribution. For example, a machine learning model 112 that predicts supply and demand of products may be trained to identify shortages and/or surpluses of a product in the first cluster 131a after a three-day period of time. According to one example, a machine learning model 112 trained to predict product supply and demand may receive as an input value a current product inventory level of three. The machine learning model 112 may predict a product inventory level of 0 within three days. The machine learning model 112 may generate a plan for the first cluster 131a, taking into account the predicted inventory level of the product in a three-day future time window. The machine learning model 112 may apply a different time window to the second cluster 131b to generate a product redistribution plan 115. For example, the machine learning model 112 may identify a current product inventory level of three. The machine learning model 112 may predict a product inventory level of 2 within one day. The machine learning model 112 may generate a plan for the second cluster 131b by taking into account the predicted inventory level of the product in a one-day future time window.

The product redistribution recommendation platform 110 may generate plans 115 according to a hierarchal priority based on: (a) product repositories within one cluster, and (b) different clusters within a set of multiple clusters. The product redistribution recommendation platform 110 may assign a higher priority to redistributing products to repository 132*a* than repository 134*a* based on the repository priority data 124. If both repositories 132*a* and 134*a* are predicted to have a product shortage, the product redistribution recommendation platform 110 may redistribute products from repository 136*a* to repository 132*a* and not to repository 134*a*, based on the relative priority levels of the repositories 132*a* and 134*a*. Similarly, product redistribution recommendation platform 110 may prioritize redistributing surplus products from two or more repositories to a particular repository based on the repository priority data 124. For example, repository 132*a* may be a centralized shipping hub. The product redistribution recommendation platform 110 may determine that all of the repositories 132*a*-136*a* in the cluster 131*a* have the same excess inventory. Based on the repository 132*a* having a higher priority value for redistribution of surplus product, the product redistribution recommendation platform 110 may generate a plan to redistribute products from the repositories 134*a*-136*a* to repository 132*a*.

The product redistribution recommendation platform 110 may further prioritize redistribution of products among different clusters based on the cluster priority data 125. Redistribution of products among clusters may be given a lower priority than redistribution of products within a cluster. For example, the product redistribution recommendation platform 110 may generate a plan 115 that first redistributes a product among product repositories within a cluster. If the cluster includes excess inventory or product shortage, the system then determines whether another cluster has a shortage or excess. The system may redistribute products among different clusters based on the shortages/excesses of the respective clusters.

According to one embodiment, clusters include sweep repositories. A sweep repository is a repository designated to hold any excess product after redistribution of products within the cluster. The cluster priority data 125 may define higher level clusters made up of sweep locations of subclusters. For example, repositories 132*a*-132*n* may be designated as sweep locations within the respective clusters 131*a*-131*n*. The cluster priority data 125 may specify the repositories 132*a*-132*n*, collectively, as a high-level cluster. Upon completing redistribution of products among the repositories in the respective clusters and holding any excess/shortage in the sweep locations (e.g., repositories 132*a*-132*n*), the product redistribution recommendation platform 110 redistributes product among the sweep locations (e.g., repositories 132*a*-132*n*) to achieve the inter-cluster rebalancing.

The product redistribution recommendation platform 110 includes a redistribution simulation engine 116 and a user interface 117. The redistribution simulation engine 116 allows a user to generate simulated product distribution data, while modifying parameters such as product excess windows, product shortage windows, and excess/shortage thresholds. The product redistribution recommendation platform 110 generates a plan 115 based on the simulated product distribution data. For example, the redistribution simulate engine 116 may obtain the current product inventory data 122 based on the actual product distribution of the products among the product repositories 132*a*-132*n*, 134*a*-134*n*, and 136*a*-136*n*. The redistribution simulation engine 116 may receive an input from a user via the user interface 117 to modify one or more product inventory values. For example, a user may modify an inventory value for a particular product in a particular repository from 10 to 3 to simulate a potential product shortage. The redistribution simulation engine 116 generates a product redistribution plan 115 based on the simulated product inventory value.

According to one or more embodiments, the redistribution simulation engine 116 generates a product redistribution plan 115 using the trained machine learning model 112. The redistribution simulation engine 116 provides a modified set of input values for product distribution data to the machine learning model 112 to generate the product redistribution plan 115. In addition to modifying product inventory values, the redistribution simulation engine 116 may generate product redistribution plans 115 for simulated product distribution data including different windows of time for which to predict surpluses and shortages, assigning different priority levels to product repositories or clusters, assigning different dates or date ranges to inventory data, specifying different relationships among products (such as one product being a substitute for another product), and applying specified redistribution criteria generated by user input.

In one or more embodiments, interface 117 refers to hardware and/or software configured to facilitate communications between a user and the product redistribution recommendation platform 110. Interface 117 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 117 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 117 is specified in one or more other languages, such as Java, C, or C++.

In an embodiment, a product redistribution recommendation platform 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 8, titled "Computer Networks and Cloud Networks."

In one or more embodiments, a product redistribution recommendation platform 110 refers to hardware and/or software configured to perform operations described herein for generating product redistribution plans based on product distribution data. Examples of operations for generating product redistribution plans based on current inventory data are described below with reference to FIG. 2.

3. Generating Recommended Product Redistribution Plan

Figure 2:
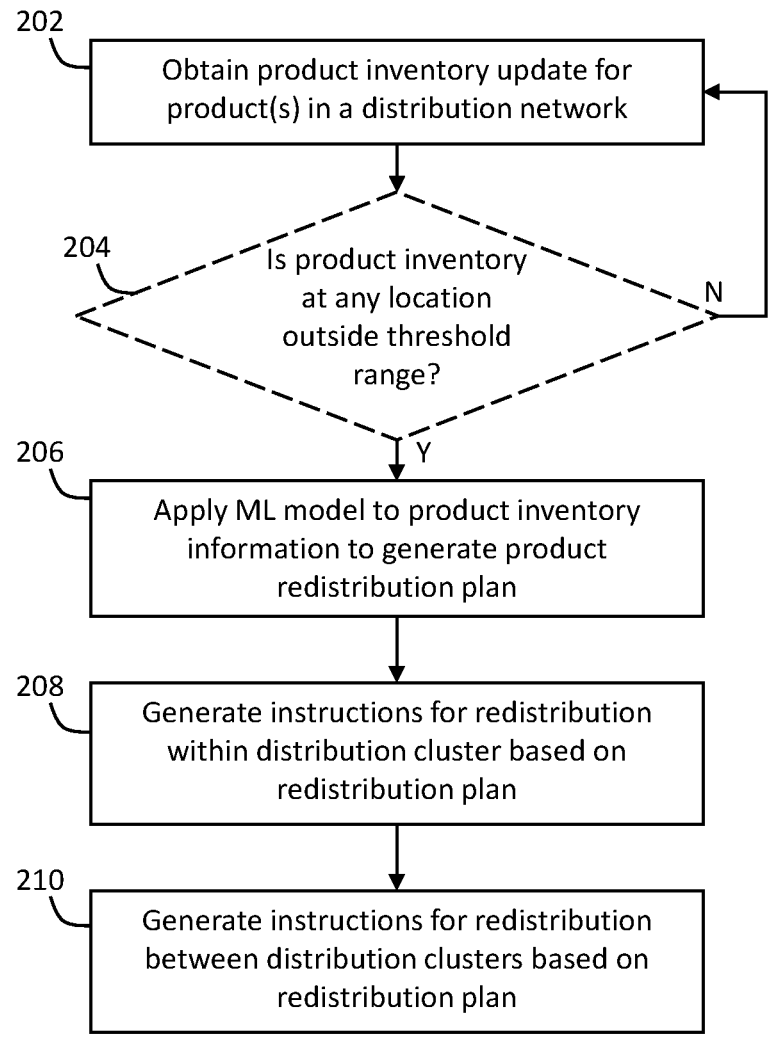
FIG. 2 illustrates an example set of operations for generating a product redistribution plan in accordance with one or more embodiments.

FIG. 2 illustrates an example set of operations for generating a product redistribution plan in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A system obtains a product inventory update for one or more products in a product inventory network (Operation 202). The product inventory network includes a plurality of product repositories, or locations, that store a product. A location may include a storefront, from which customers purchase the product resulting in a decrease in inventory at the location. A location may also include a warehouse that stores a product. A location may include both a storefront and an attached warehouse. The system may be a system that tracks inventory in a product network and generates plans for redistributing inventory among multiple locations. The update may be data obtained from one or more locations indicating changes to product inventory. For example, the system may be set up to receive an update at regular intervals, such as daily, describing a state of inventory at each location.

The system determines whether a product inventory at any location is above or below a threshold level (Operation 204). The threshold levels may be different for each location. For example, a storefront location may have an upper threshold of 10 excess units of inventory and a lower threshold of 1 unit of inventory. Another storefront location, which may be a larger location, may have an upper threshold of 20 excess units of inventory. A location may have a negative threshold of inventory, representing an inventory of zero with a positive predicted demand for the inventory. For example, the system may predict that 1 unit of product is sold from a location each day. When the product inventory runs out, the system may represent the inventory as "−1" after one day, "−2" after two days, etc. A location may have a negative product shortfall threshold. The system may set a threshold for a location to "4", indicating that the system will not initiate inventory rebalancing until the inventory at the location has reached zero and a certain period of time has elapsed associated with a particular predicted demand for the product.

According to an alternative embodiment, the system may proceed to operation 206 without analyzing product inventory levels. For example, the system may analyze a relative profit margin associated with a product at two different locations. According to another example embodiment, a system may perform a periodic product redistribution plan analysis without being triggered by characteristics, such as inventory levels, price, or profit, associated with the product.

Referring to the example embodiment in which inventory levels trigger a redistribution plan analysis, if the system determines that product inventory at a location is outside a threshold level, the system applies a machine learning model to the inventory information to generate a product redistribution plan (Operation 206). The system applies a trained machine learning model to a dataset including the inventory values for a set of locations for which redistribution is being calculated. The dataset may also include additional attributes associated with the inventory, such as: a date, inventory values for a range of time, such as over three days, inventory values for multiple products, including substitute products and complementary products, current product transport information, and current product pricing information. The machine learning model generates a plan for redistributing one or more products among the set of locations. According to one or more embodiments, the locations are organized into clusters. The machine learning model may generate a plan for redistributing the one or more products according to a particular hierarchy. Specifically, the machine learning model may generate a plan for: (a) redistributing the one or more products among different locations within a cluster, and (b) if, after redistributing products among the different locations within a cluster, an excess or shortfall exists in the cluster, redistributing the one or more products between different clusters. The system may train the machine learning model to generate the plans based on a particular set of rules. For example, a training dataset used to train the machine learning model may attribute higher scores to data points that comply with rules and lower scores to data points that do not comply with the rules. The rules may specify the hierarchy for redistributing products. For example, a data point that transports a product to or from a location that is not a designated sweep location may be associated with a low score, training the machine learning model to avoid plans that transport items to or from a location that is not a designated sweep location.

The system generates instructions for redistributing a product within an inventory cluster based on the redistribution plan (Operation 208). The system may generate the instructions without user intervention. Alternatively, the system may present the plan to a user for approval prior to generating the instructions. The instructions may include electronic communications to locations and to transportation services to deliver particular quantities of products to particular locations. Examples of instructions include instructions to move products between locations, instructions to change a designated sweep location, instructions to reconfigure clusters by removing a location from a cluster or adding a location to a cluster, and instructions for reconfiguring the redistribution order or priority assigned to different locations within a cluster or to different clusters in a set of multiple clusters.

The system generates instructions for redistributing the product between product inventory clusters based on the redistribution plan (Operation 210). The system generates instructions for redistributing the product between different product inventory clusters when the system determines that one or more inventory clusters, made up of multiple locations, had excess inventory or an inventory shortage. The system may generate the instructions without user intervention. Alternatively, the system may present the plan to a user for approval prior to generating the instructions. The instructions may include electronic communications to locations and to transportation services to deliver particular quantities of products to particular locations. According to one or more embodiments, an inventory cluster, made up of multiple inventory repositories, may include a designated "sweep" location. The system may move any excess inventory in the cluster to the sweep location for storage. When generating instructions for redistributing one or more products between different inventory clusters, the system may move products from the sweep location to a location of another cluster, without moving products from other locations in the cluster. In other words, Operation 208 may move one or more products among locations within a cluster. Operation 210 may move the products to or from sweep locations between different clusters. Products located at locations other than the designated sweep locations may not be moved between different clusters.

4. Machine Learning Model Training

Figure 3:
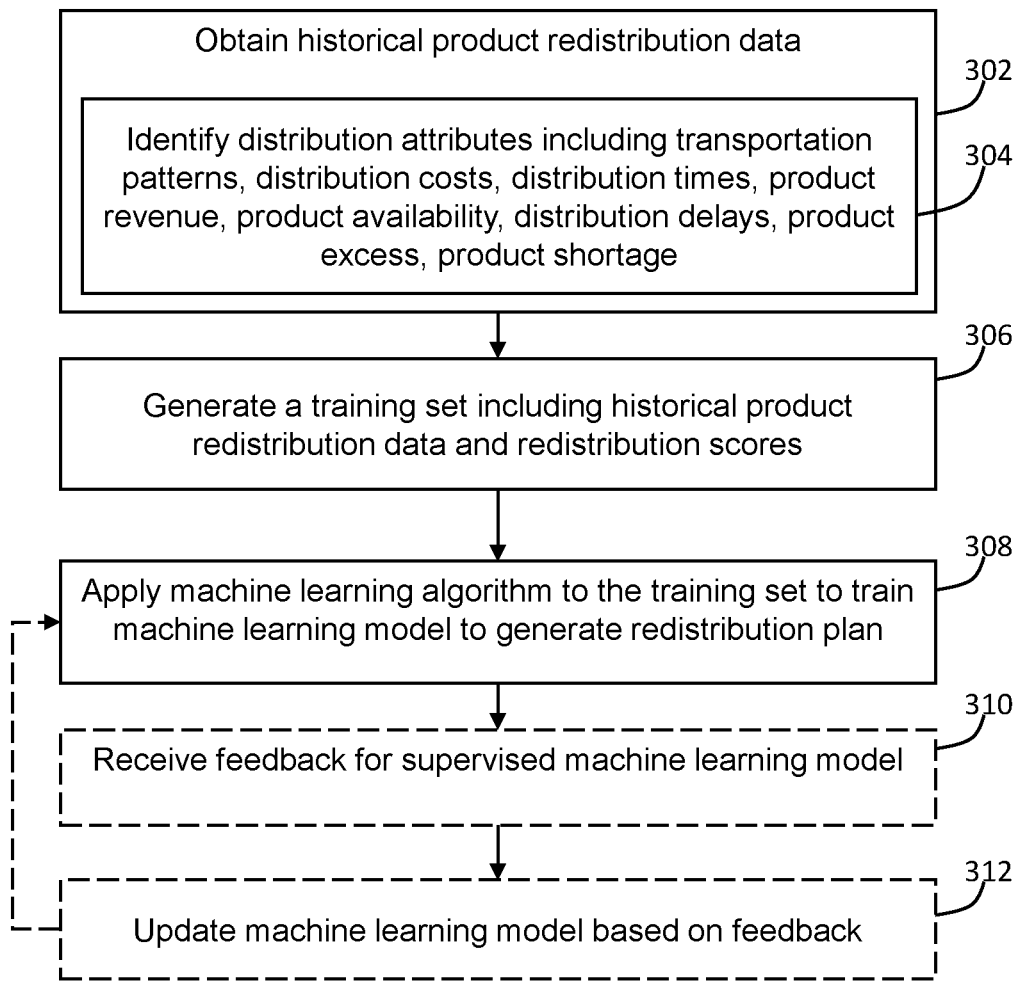
FIG. 3 illustrates a set of operations for training a machine learning model to recommend a product redistribution plan according to one or more embodiments.

FIG. 3 illustrates an example set of operations for training a machine learning model to generate a plan for redistributing products among product repositories in accordance with one or more embodiments.

The method includes identifying or obtaining historical product redistribution data (Operation 302). Historical product redistribution data may include historical inventory data including an inventory of one or more products located at a plurality of product repositories. The historical product redistribution data includes a historical redistribution of products among the product repositories, different dates and times at which products were distributed, transportation patterns, distribution costs, distribution times, product revenue per location, product availability, distribution delays, product excess at one or more repositories, and product shortages at one or more repositories (Operation 304). The historical product redistribution data may also include shortage data and excess data associated with the one or more products.

The system uses the historical product redistribution data to generate a set of training data (Operation 306). The set of training data includes, for each particular set of historical product redistribution data, a product redistribution score. For example, the training data identifies an initial inventory state among a set of inventory repositories, a product redistribution among the set of inventory repositories, and a value label associated with the set of product redistribution data. The label may include a score based on one or more criteria such as: the profitability of the product redistribution, a vendor satisfaction level with the product redistribution, an effectiveness of meeting product demand, an effectiveness of keeping inventories within threshold ranges at product repositories, and a customer satisfaction level associated with the product redistribution. For example, a product redistribution that maintained inventories within a threshold range but resulted in a relatively low profitability may be associated a relatively low score. A product redistribution that included one or more inventory levels at one or more locations that were outside a threshold range, but that resulted in a relatively high profitability, may be associated with a relatively high score. The scores may be generated or modified by human input. Alternatively, the scores may be generated by a computer applying a particular set of weights to the above-described criteria.

According to another embodiment, a computer may generate an initial score based on applying particular sets of weights to the above-described criteria. A user may modify the initial score to generate a final score for a particular product redistribution. The product redistribution scores may be associated with particular redistribution rules. The system may assign higher scores to data points in the training set that comply with the rules. The system may assign lower scores to data points in the training set that do not comply with the rules. For example, a rule may specify a particular redistribution priority among product inventory repositories and clusters of product inventory repositories. The system may assign a relatively higher score to a data point in which products are redistributed first among locations within a cluster, with any excess being redistributed to a designated sweep location. Only after redistributing the products among the locations within the cluster are products redistributed between different clusters. The system may assign a relatively lower score to a data point in which products are redistributed among different locations in different clusters before being redistributed among locations within a same cluster.

The system applies a machine learning algorithm to the training data set to perform an initial training of the machine learning model (Operation 308). The machine learning algorithm analyzes the training data set to train neurons of a neural network with particular weights and offsets to associate particular product redistribution characteristics with particular product redistribution scores. The machine learning algorithm trains the machine learning model to generate a plan for product distribution among a set of product repositories based on the product redistribution scores. For example, the machine learning model may generate scores associated with product redistributions of particular sets of historical product redistribution data. The system adjusts the particular weights and offsets of the neural network based on a difference between the generated score and the score stored in the training data set. For example, the system may perform back-propagation in the neural network to adjust the weights and offsets of the neural network based on the difference between the generated score and the score stored in the training data set. In operation, the machine learning model may run through a set of potential product redistributions. The machine learning model may generate a plan for a particular redistribution based on the relative redistribution scores of the respective redistributions in the set of product redistributions.

In embodiments in which the machine learning algorithm is a supervised machine learning algorithm, the system may optionally obtain feedback on the various aspects of the analysis described above (Operation 310). For example, the feedback may affirm or revise product redistribution scores generated by the machine learning model. The machine learning model may indicate that a particular set of product inventory data and redistribution data is associated with a particular redistribution score. The system may receive feedback indicating that the particular redistribution data should instead be associated with a different redistribution score.

Based on associations identified by the machine learning model and/or feedback, the machine learning training set may be updated, thereby improving its analytical accuracy (Operation 312). Once updated, the machine learning model may be further trained by optionally applying it to additional training data sets.

5. Simulating Product Redistribution within a Product Inventory Network

Figure 4:
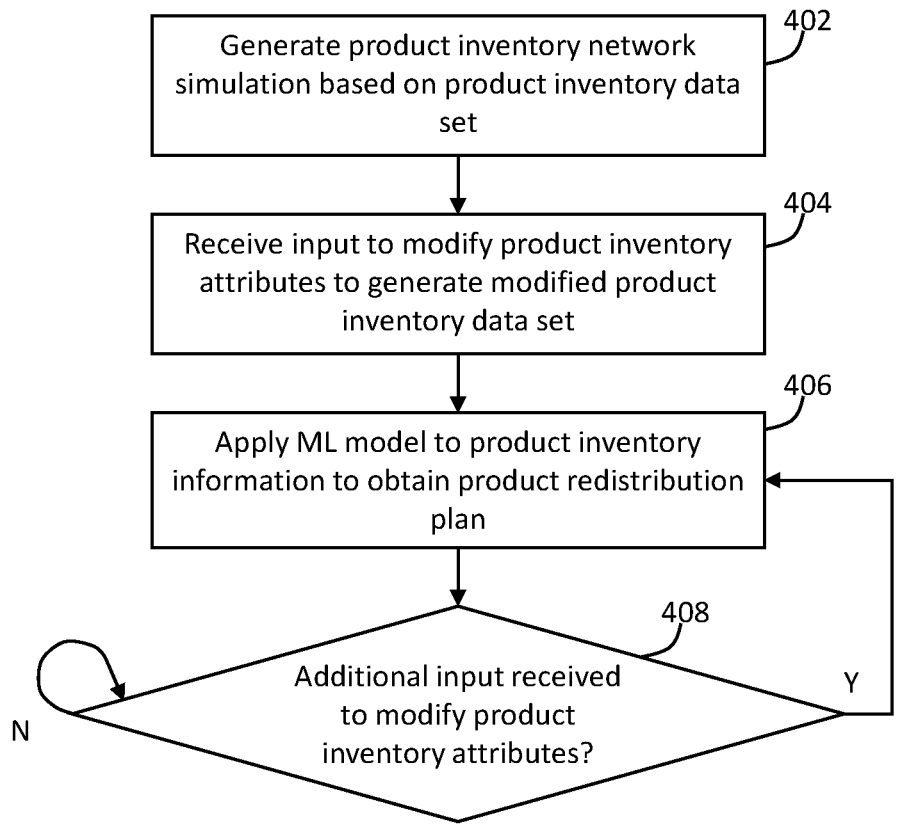
FIG. 4 illustrates an example set of operations for simulating a product inventory network in accordance with one or more embodiments.

FIG. 4 illustrates an example set of operations for simulating a product inventory network in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

A system generates a product inventory network simulation based on a product distribution data set (Operation 402). The simulation may include a graphical user interface (GUI) displaying locations of a product inventory network generated based on actual product inventory information. For example, the system may obtain data from locations in a product inventory network representing the actual inventory values at the locations. Alternatively, the simulation may be based on user-generated inventory values. For example, a user may wish to apply product inventory forecasts for the roll-out of a new product. The user may input to the system the predicted inventory levels at different locations to predict the effectiveness of the product roll-out.

The system receives an input to modify one or more product inventory attributes in the product distribution data set (Operation 404). For example, a user my modify the inventory amount at one or more locations within a cluster of product inventory repositories. The modification in the simulation may not affect actual inventory values in an inventory monitoring system. The inventory attributes may include, for example: inventory values representing a number of units of a product at a location, dates, transportation costs to move inventory from one location to another, and transportation time to move inventory from one location to another. For example, a user may wish to simulate the effects in the supply chain of a delay in providing inventory from one location to another. Accordingly, the user may provide an input to the system to modify the transportation time for inventory between two locations.

The system applies a machine learning model to the modified product distribution data set to generate a plan for redistributing one or more products among product repositories in a product inventory network (Operation 406). The plan specifies, for the simulated product inventory values, a recommended redistribution of the product among a set of product repositories. For example, if a user modifies an inventory value to simulate an excess inventory at a particular location, the machine learning model generates a redistribution plan to transfer the excess inventory to one or both of a product repository having an inventory shortage or a sweep location designated to store excess inventory in a cluster.

The system determines whether an additional input is received to further modify attributes of the product distribution data (Operation 408). For example, the machine learning model may predict a product shortage at a particular location within a product inventory network at a particular date. A user may modify attributes of the network, such as available inventory, inventory delivery times, and product cost to model the effectiveness of particular actions to address a predicted product shortage.

6. Hierarchy-Based Product Redistribution

Figure 5:
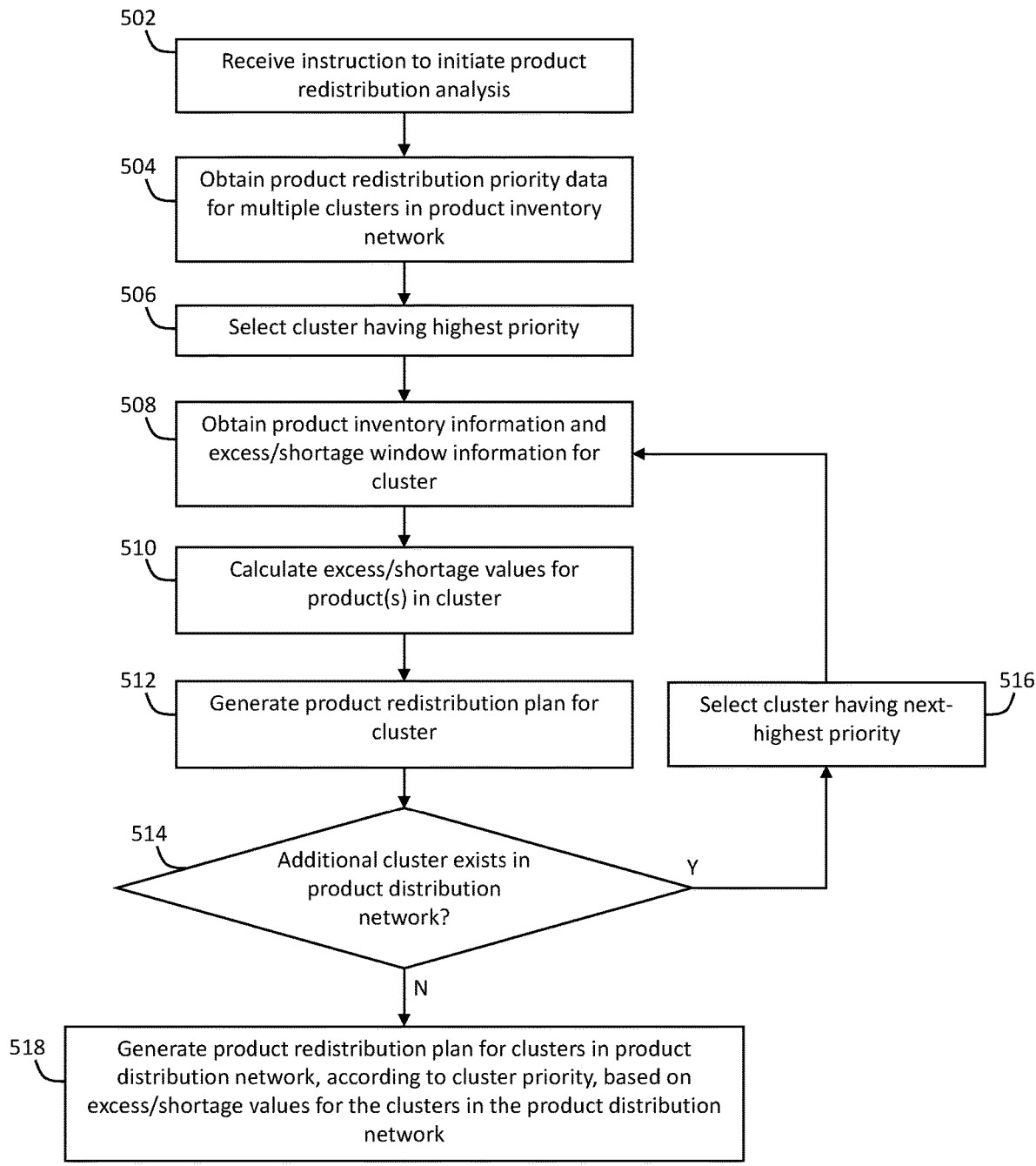
FIG. 5 illustrates an example set of operations for using a hierarchal cluster-based organization of product repositories to redistribute products in accordance with one or more embodiments.

FIG. 5 illustrates an example set of operations for using a hierarchy-based product redistribution among product repositories organized into repository clusters in accordance with one or more embodiments. One or more operations illustrated in FIG. 5 may be modified, rearranged, or omitted all together. Accordingly, the particular sequence of operations illustrated in FIG. 5 should not be construed as limiting the scope of one or more embodiments.

A system receives an instruction to initiate a product redistribution analysis associated with a particular product inventory network (Operation 502). The instruction may be user-initiated, triggered by a detected product inventory level at a location, or part of a regularly-scheduled redistribution analysis. For example, the system may monitor product inventory levels at multiple product repositories in different clusters of product repositories. The system may generate an instruction to initiate the product redistribution analysis based on detecting inventory levels outside a threshold range (either a shortage or an excess) at a predetermined number of product inventory locations.

The system obtains product redistribution priority data for multiple clusters in a product inventory network (Operation 504). Priority data includes: relative priority values for different product repositories within a cluster of product repositories, and relative priority values for different clusters of product repositories. The priority data represents an order in which products should be moved from and moved to different product repositories relative to each other. For example, two product repositories in the same cluster may have the same predicted inventory shortage and different priority values. The system would distribute excess inventory from a third inventory repository to the repository having the higher priority value prior to distributing inventory to the repository having the lower priority value. Similarly, the system distributes excess inventory from one cluster to a cluster having a higher priority value prior to distributing inventory to a cluster having a lower priority value.

The system identifies a cluster, among the multiple clusters, that has a highest priority value (Operation 506). The system obtains product inventory information and product excess/product shortage window information for the identified cluster (Operation 508). Product inventory information includes inventory values representing a number of units of a product at each product repository in the cluster. Product inventory information also includes: transport times to transport products from one repository in the cluster to another repository in the cluster, supply and demand data predicting a rate at which the inventory is expected to decrease or increase over time, product relationship data identifying whether any products are substitutes for other products or complementary to other products, price data, seasonality data (e.g. whether demand is expected to change over time), and data identifying at least one of the repositories as a designated sweep location. The designated sweep location is a repository designated to receive excess inventory from other repositories in a cluster. The product excess window information and the product shortage window information specify a window of time beyond which an excess/shortage is calculated for a cluster. For example, a shortage window of three days results in the system determining whether and how to redistribute a product based on predicting supply and demand for the product after a three day period of time has elapsed. An excess window of one week results in the system determining whether and how to redistribute a product based on predicting supply and demand for the product during, and at the end of, a one-week period of time.

In one or more embodiments, a determination of whether a repository has a product excess or product shortage is made based on a predicted excess/shortage of the product at the margin of the excess/shortage window. For example, if an excess window is four days, and if the inventory value for a repository is: Day 1: 10, Day 2: 5, Day 3: 1, Day 4: −2, then the system may determine whether the repository has an excess inventory at the last day of the excess window (e.g., based on the value at Day 4). The windows for calculating product excess and product shortages may be designated, for each cluster, by a user. Alternatively, the windows may be calculated by a computer, without human intervention, based on predefined criteria. For example, a computer may calculate a window size for an inventory shortage window or inventory excess window based on a lead time of resupplying a location with a product. According to one example, a computer may specify a three-day shortage window based on determining that an average time required to transport goods between product repositories in a cluster is four days. The computer may apply a particular formula, such as [lead time in days]*0.75=[inventory shortage window in days], to calculate a length of an inventory shortage window.

The system performs a calculation of the product excess/product shortage for the product repositories in the selected cluster (Operation 510). The system applies the product excess window and product shortage window to the inventory of each product repository in a cluster to predict whether the product repository will have a product excess after a time specified by the product excess window and/or a product shortage specified by a time specified by the product shortage window. The system repeats the process of, for each product repository, (a) applying the product excess window to a product repository to predict a product excess after a specified period of time, and (b) applying the product shortage window to the product repository to predict a product shortage after a specified period of time. According to one or more embodiments, the system applies a machine learning model to the product inventory data to predict the supply and demand of the product for each product repository.

The system generates a product redistribution plan for the selected cluster (Operation 512). The system generates the product redistribution plan by identifying redistribution priority levels for product repositories in the selected cluster. Among one or more product repositories for which the system predicts a product shortage, the system identifies the product repository having the highest priority. The system determines whether the shortage may be remediated by transferring inventory from another product repository for which the system predicted an excess product. If the shortage may be remediated by transferring inventory from another product repository for which the system predicted an excess product, the system generates a sub-instruction to transfer the inventory from the product repository for which an excess is predicted to the product repository for which a shortage is predicted.

The system determines if the product inventory network includes additional clusters (Operation 514). If so, the system identifies the product repository having the next-highest priority among the one or more product repositories for which a shortage is predicted (Operation 516). The system again determines whether the shortage may be remediated by transferring inventory from another product repository for which the system predicted an excess product. The system sequentially selects, in descending order of priority, the product repositories for which a shortage is predicted and determines whether the shortages may be remediated by transferring inventory from another product repository for which the system predicted an excess of product. The system generates a product redistribution plan for the cluster that is made up of the sub-plans associated with redistributing products to and from the different repositories in the cluster. The system repeats operations 508-516 for each cluster until each cluster in a product inventory network has been selected and the excess/shortage values have been calculated for each cluster.

While the above example generates product redistribution sub-plans on a repository-by-repository basis based on the priority levels associated with the repositories, one or more embodiments generate plans based on additional criteria. For example, the system may generate redistribution plans based on a mathematical formula, a set of rules, or a machine learning model receiving as input values: a cost to transfer inventory from one repository to another, a time to transfer inventory from one repository to another, whether a number of excess products of one repository is an exact match of a shortage of products of another repository, revenue lost by transferring inventory from a repository, and revenue gained by transferring inventory to a repository.

The system generates a product redistribution plan for the product inventory network (Operation 518). The system determines whether to redistribute one or more products between different product inventory clusters according to the priority of the respective clusters. For example, the system may identify a set of product inventory clusters, each cluster made up of multiple product repositories, which the system predicts would have a product shortage, after implementing product redistribution plans within the respective clusters. The system identifies the cluster having the highest priority and determines if the shortage may be remediated by transferring inventory from another cluster for which the system predicts a product excess after implementing a product redistribution plan in the cluster. According to one example, the system may determine that one cluster would have an excess of ten units of product after implementing a product redistribution plan for the cluster. The system may determine that another cluster would have a shortage of five units of product after implementing a product redistribution plan for the cluster. The system may generate a plan to redistribute five units of product from the first cluster to the second cluster. The system may update the product redistribution plan for the second cluster based on the transfer of product between clusters.

7. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 6A:
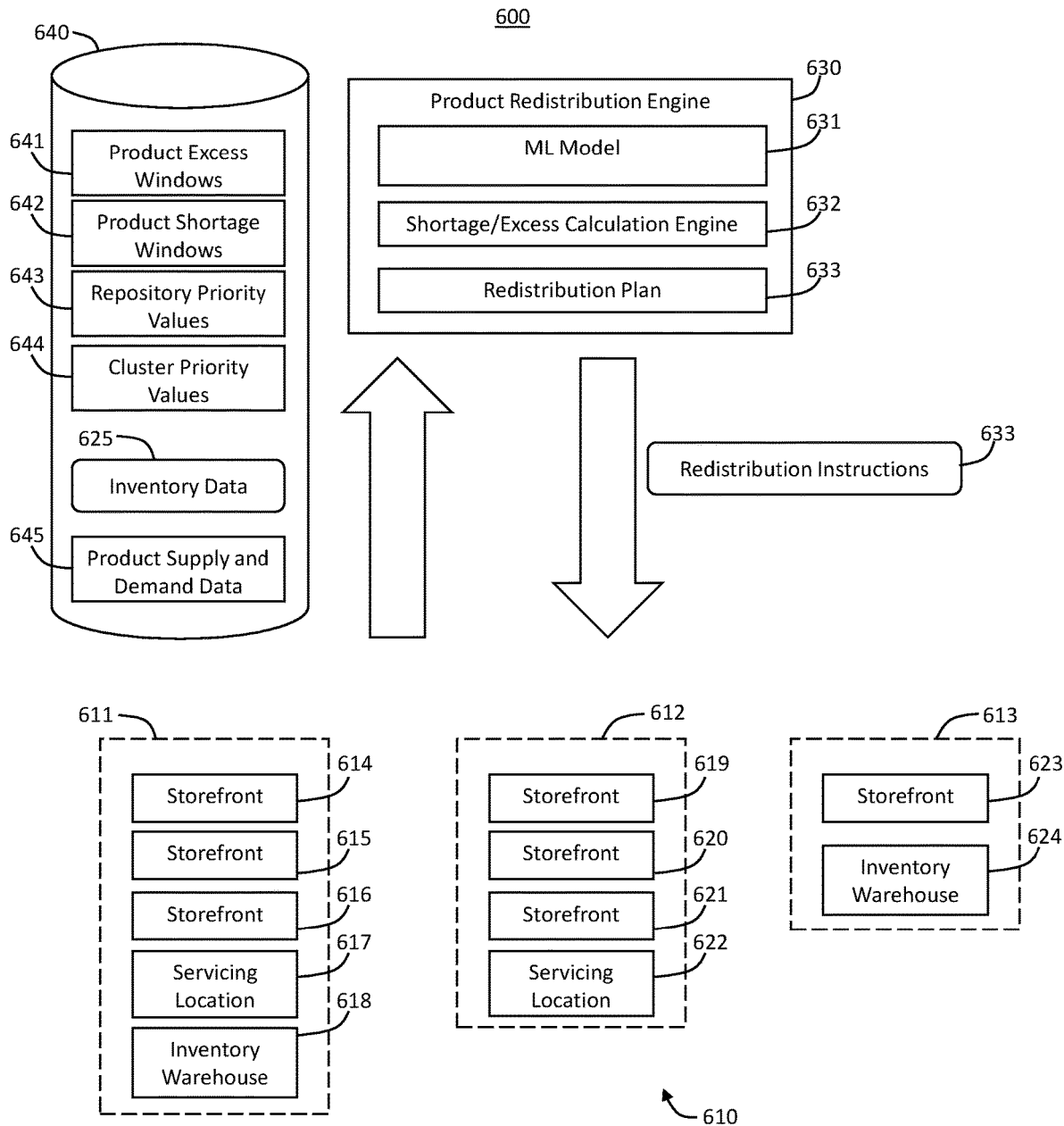
FIGS. 6A and 6B illustrate an example embodiment of generating a product redistribution plan.
Figure 6B:
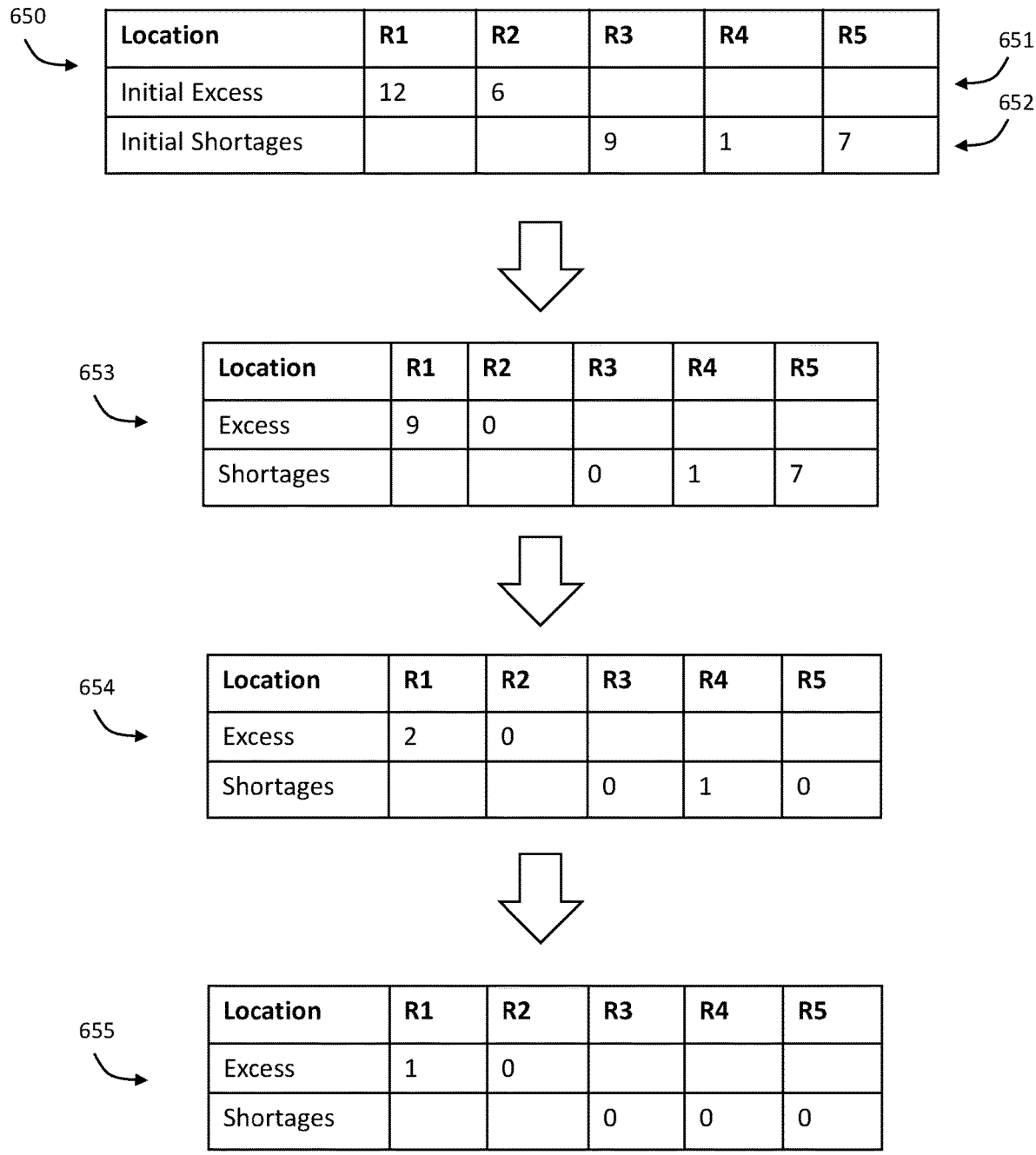

FIGS. 6A and 6B illustrate a series of operations for generating a redistribution plan and redistributing products among product repositories based on the plan. As illustrated in FIG. 6A, a product inventory network 610 includes three clusters 611, 612, and 613. Each cluster includes multiple product repositories. Cluster 611 includes storefronts 614-616, which may be physical locations where a particular product is sold to customers. A servicing location 617 is a location where products may be repaired. Inventory warehouse 618 may be a location where products are stored. The inventory warehouse 618 may not be associated with a storefront. Cluster 612 includes storefronts 619-621 and servicing location 622. Cluster 613 includes a storefront 623 and an inventory warehouse 624.

The system 600 obtains inventory data 625 from the product inventory network 610. The system 600 may store the inventory data 625 in a data repository 640. A product redistribution engine 630 receives the inventory data 625 and generates a redistribution plan 633 based on the inventory data 625. A product shortage/product excess calculation engine 632 calculates product shortages and product excesses among the clusters 611-613 using the inventory data 625. The product redistribution engine 630 applies a machine learning model 631 to the inventory data 625 to generate a product redistribution plan 633. The product redistribution engine 630 provides product redistribution instructions 633, based on the redistribution plan 633, to the product inventory network 610. In addition to the inventory data 625, the product redistribution engine 630 generates the plan 633 by applying product excess windows 641 and product shortage windows 642 to the inventory data 625 associated with the clusters 611, 612, and 613 to generate product excess and product shortage predictions. The product redistribution engine 630 provides to the machine learning model 631 repository priority values 643, cluster priority values 644, and supply and demand data 645, to generate a plan 633 that redistributes products among different repositories within the same cluster according to the repository priority values 643, and between different clusters according to priority values 644.

FIG. 6B illustrates an example of a series of tables representing operations for generating a redistribution plan. The series of operations illustrated in FIG. 6B may be performed by applying a set of rules to the inventory data 625 and the product excess/product shortage data generated by the product shortage/product excess calculation engine 632. Alternatively, the series of operations may represent values learned by a neural network during training. In an embodiment in which the plan is generated by the neural network, the system does not apply a set of rules to the neural network. Instead, the data set used to train the neural network reinforces data points that comply with the rules represented by the series of operations illustrated in FIG. 6B. The redistribution score values penalize data points (e.g., associates data points with a low redistribution score) that do not comply with the series of operations illustrated in FIG. 6B.

The system obtains inventory data from the set of repositories 614-618 in the cluster 611. In FIG. 6B, repository R1 corresponds to the warehouse 618. Repositories R2-R5 correspond to the storefronts 614-617, respectively. The system applies an excess product window to the inventory data to generate a set of excess product values 651, shown in the table 650. The system applies a product shortage window to the inventory data to generate a set of product shortage values 652. In the example illustrated in FIG. 6B, the excess product window is five days. For each day of the excess product window, the system predicts the product excess at repository R1. For example, the system predicts repository R1 will have a product excess of 12 units in three days (or two days prior to the last day of the excess product window). The system predicts the repository R2 will have a product excess of 6 units in three days. In the example illustrated in FIG. 6B, the product shortage window is three days. The system predicts the repositories R3, R4, and R5 will have shortages of 9 units, 1 unit, and 7 units, respectively in three days (or the last day of the product shortage window).

The system applies a rule to prioritize redistributing products to repositories having a highest predicted product shortage. The system selects repository R2 to transfer products to repository R3 based, in part, on repository R2 having a shorter lead time than repository R1 to transfer products to repository R3. Next, the system applies a rule to prioritize redistributing products to a same repository until an inventory shortage is remediated prior to redistributing products to different repositories. Accordingly, the system selects repository R1 to transfer products to repository R3.

As shown in the table 653, based on the transfer of products from repositories R2 and R1 to repository R3, the system predicts the repository R3 will no longer have a shortage in three days.

As shown in table 654, the system next applies the rule to redistribute products to a repository having the highest shortage to transfer 7 units of a product from repository R1 to repository R5. As shown in table 655, the system next applies the rule to redistribute products to a repository having the highest shortage to transfer 1 unit of a product from repository R1 to repository R4. The repository R1 may be a designated sweep repository, such that upon completion of the redistribution of excess inventory to repositories having product shortages, any remaining inventory is transferred to or maintained at repository R1. In FIG. 6B, the cluster 611 has one remaining excess product after redistribution of products within the cluster.

Referring to FIG. 6A, the product redistribution engine 630 repeats the process of redistributing product inventory in clusters 612 and 613. If either of clusters 612 and 613 is left with a product shortage after redistribution among the repositories within the clusters, the system may transfer the excess product from cluster 611 to one of the clusters 612 and 613. If both clusters 612 and 613 are left with a product shortage, the system determines which cluster has a higher priority and transfers the product to the cluster having the higher priority.

The process described above with respect to redistributing products among the repositories 614-624 and the clusters 611-613 may describe generating the plan 633 for redistributing products. In one or more embodiments, a user may modify a plan 633 to generate the redistribution instructions 633 that initiate a redistribution operation among inventory facilities and transportation services. According to another example embodiment, the system 600 generates the redistribution instructions 633 and initiates redistribution of products without intervening user input, after the product redistribution analysis has begun.

8. Computer Networks and Cloud Networks

In one or more embodiments, a product redistribution recommendation platform may be embodied in a computer network which provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
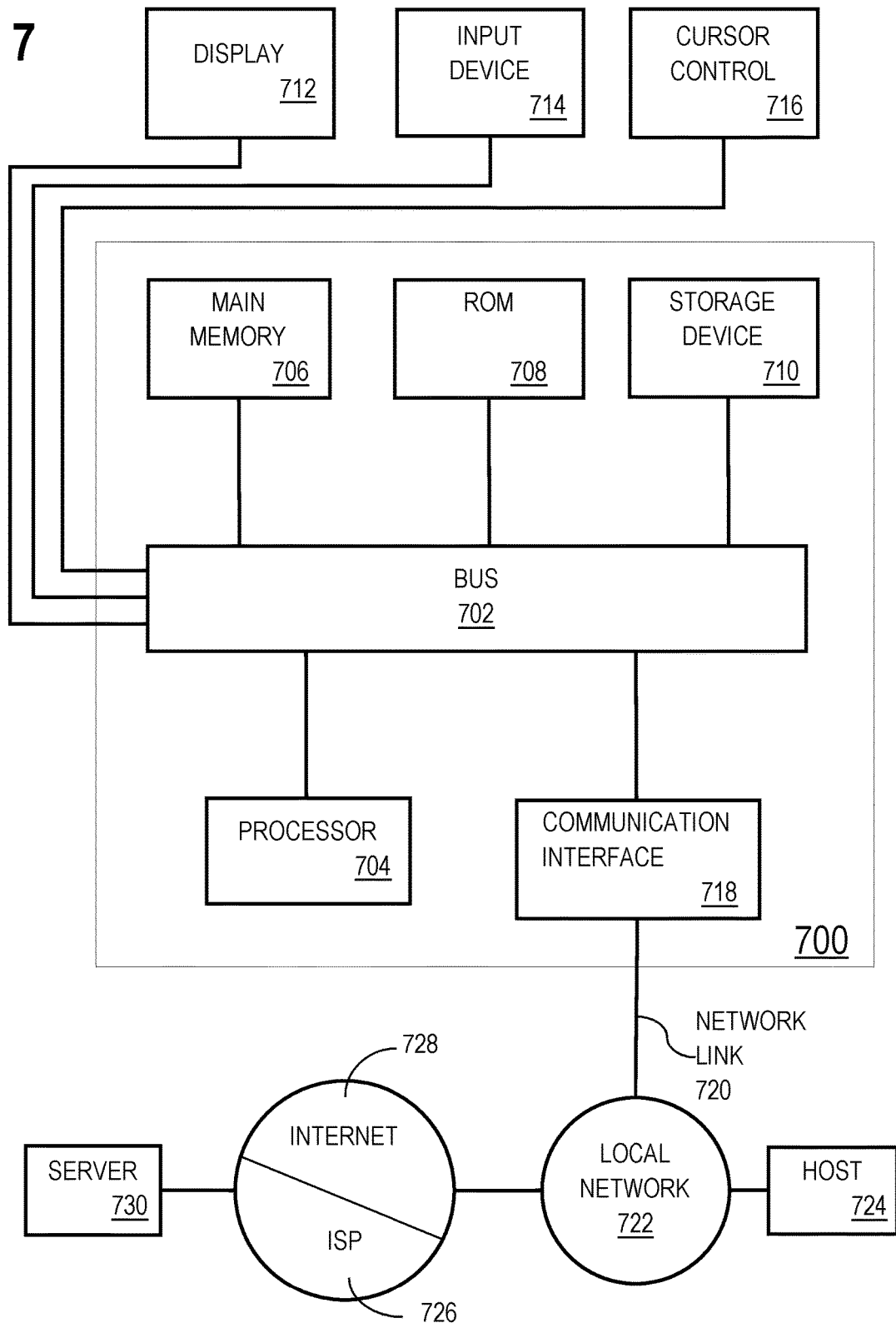
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors cause performance of operations comprising:
   obtaining training data of sets of historical product redistribution data, a set of historical product redistribution data comprising:
      a set of redistribution characteristics comprising:
         a time to redistribute a product between two or more product repositories;
         a cost to redistribute the product between the two or more product repositories; and
         a score for the set of historical product redistribution data, wherein the score represents at least one of:
            a profitability of the historical product redistribution data;
            a vendor satisfaction level;
            a customer satisfaction level;
            an effectiveness of the historical product redistribution data at meeting product demand; and
            an effectiveness of the historical product redistribution data at keeping inventory levels within a threshold range;
         wherein the set of redistribution characteristics further comprises at least one of:
            a reliability of an estimate for the time or the cost to redistribute the product between the two or more product repositories;
            a rate of reduction of supply of the product from the two or more product repositories; and
            an interval of resupply of the product to the two or more product repositories;
   training a machine learning model based on the training data set to generate recommendations for redistributing the product among the two or more product repositories;
   obtaining inventory data for inventory of the product at, at least a subset of the two or more product repositories; and
   applying the trained machine learning model to the inventory data to generate a first recommendation for redistributing the product among the two or more product repositories
   wherein the two or more product repositories correspond to product repositories within a first cluster of a plurality of clusters, and
   wherein the operations further comprise:
      obtaining a plurality of sets of inventory data for a plurality of sets of product repositories corresponding to the plurality of clusters, wherein applying the trained machine learning model to the inventory data includes applying the trained machine learning model to a first set of inventory data corresponding to a first set of product repositories of the first cluster among the plurality of clusters to generate the first recommendation for redistributing the product among the first set of product repositories;

applying the trained machine learning model to a second set of inventory data corresponding to a second set of product repositories of a second cluster among the plurality of clusters to generate a second recommendation for redistributing the product among the second set of product repositories;

determining a third set of inventory data corresponding to the first cluster based on applying the first recommendation to the first cluster;

determining a fourth set of inventory data corresponding to the second cluster based on applying the second recommendation to the second cluster; and applying the trained machine learning model to a fifth set of inventory data, including the third set of inventory data and the fourth set of inventory data, to generate a third recommendation for redistributing the product among the plurality of clusters.

2. The non-transitory computer readable medium of claim 1, wherein the two or more product repositories correspond to product repositories across multiple clusters of a plurality of clusters.

3. The non-transitory computer readable medium of claim 1, wherein applying the trained machine learning model to the inventory data further comprises applying the machine learning model to a distribution constraint.

4. The non-transitory computer readable medium of claim 1, wherein the operation further comprise:

obtaining second inventory data for inventory of a second product at, at least a second subset of the two or more product repositories; and applying the trained machine learning model to the second inventory data to generate a second recommendation for redistributing a third product, as a substitute for the second product, among the two or more product repositories.

5. The non-transitory computer readable medium of claim 1, wherein the first recommendation for redistributing the product among the two or more product repositories comprises:

redistributing the product among a first plurality of product repositories assigned to a first cluster of product repositories; and redistributing the product among a second plurality of product repositories assigned to a second cluster of product repositories;

(a) determining, based on redistributing the product among the first plurality of product repositories assigned to the first cluster of product repositories, that the first cluster has at least one excess product unit; and (b) determining, based on redistributing the product among the second plurality of product repositories assigned to the second cluster of product repositories, that the second cluster has a product shortage of at least one product unit, wherein the first recommendation further comprises: based on (a) and (b), transferring the at least one excess product unit from the first cluster of product repositories to the second cluster of product repositories.

6. The non-transitory computer readable medium of claim 1, wherein the operations further comprise:

obtaining a product shortage window defining a particular period of time;

predicting product supply and demand values for the two or more product repositories over a period of time including the product shortage window;

based on the predicted product supply and demand values: predicting product shortage values for the two or more product repositories at a particular time associated with an end of a product shortage window; and applying the trained machine learning model to the inventory data to generate a particular recommendation for redistributing the product among the two or more product repositories.

7. The non-transitory computer readable medium of claim 1, wherein applying the trained machine learning model to the inventory data to generate the first recommendation comprises:

generating, by the machine learning model, at least:
a first candidate redistribution plan and a first redistribution score; and
a second candidate redistribution plan and a second redistribution score; and based on comparing the first redistribution score to the second redistribution score, selecting, by the machine learning model, the first candidate redistribution plan as the first recommendation.

8. The non-transitory computer readable medium of claim 1, wherein the time to redistribute the product between the two or more product repositories comprises:

a first time to redistribute a first excess product from a first product repository to a first aggregation repository; and a second time to redistribute a second excess product from a second product repository to the first aggregation repository.

9. The non-transitory computer readable medium of claim 8, wherein the first product repository and the second product repository correspond to product repositories within a first cluster of a plurality of clusters, determining a first set of inventory data corresponding to the first aggregation repository in the first cluster;

determining a second set of inventory data corresponding to a second aggregation repository in a second cluster, among the plurality of clusters; and applying the trained machine learning model to a third set of inventory data, including the first set of inventory data and a second set of inventory data, to generate a second recommendation for redistributing the product among the plurality of clusters.

10. A method comprising:

obtaining training data of sets of historical product redistribution data, a set of historical product redistribution data comprising:

a set of redistribution characteristics comprising:
a time to redistribute a product between two or more product repositories;
a cost to redistribute the product between the two or more product repositories; and
a score for the set of historical product redistribution data, wherein the score represents at least one of:
a profitability of the historical product redistribution data;
a vendor satisfaction level;
a customer satisfaction level;
an effectiveness of the historical product redistribution data at meeting product demand; and
an effectiveness of the historical product redistribution data at keeping inventory levels within a threshold range;

wherein the set of redistribution characteristics further comprises at least one of:
a reliability of an estimate for the time or the cost to redistribute the product between the two or more product repositories;
a rate of reduction of supply of the product from the two or more product repositories; and
an interval of resupply of the product to the two or more product repositories;
training a machine learning model based on the training data set to generate recommendations for redistributing the product among the two or more product repositories;
obtaining inventory data for inventory of the product at, at least a subset of the two or more product repositories; and
applying the trained machine learning model to the inventory data to generate a first recommendation for redistributing the product among the two or more product repositories,
wherein the two or more product repositories correspond to product repositories within a first cluster of a plurality of clusters, and wherein the method further comprises:
obtaining a plurality of sets of inventory data for a plurality of sets of product repositories corresponding to the plurality of clusters, wherein applying the trained machine learning model to the inventory data includes applying the trained machine learning model to a first set of inventory data corresponding to a first set of product repositories of the first cluster among the plurality of clusters to generate the first recommendation for redistributing the product among the first set of product repositories;
applying the trained machine learning model to a second set of inventory data corresponding to a second set of product repositories of a second cluster among the plurality of clusters to generate a second recommendation for redistributing the product among the second set of product repositories;
determining a third set of inventory data corresponding to the first cluster based on applying the first recommendation to the first cluster;
determining a fourth set of inventory data corresponding to the second cluster based on applying the second recommendation to the second cluster; and
applying the trained machine learning model to a fifth set of inventory data, including the third set of inventory data and the fourth set of inventory data, to generate a third recommendation for redistributing the product among the plurality of clusters.

11. The method of claim 10, wherein the two or more product repositories correspond to product repositories across multiple clusters of a plurality of clusters.

12. The method of claim 10, wherein applying the trained machine learning model to the inventory data further comprises applying the machine learning model to a distribution constraint.

13. The method of claim 10, further comprising:
obtaining second inventory data for inventory of a second product at, at least a second subset of the two or more product repositories; and
applying the trained machine learning model to the second inventory data to generate a second recommendation for redistributing a third product, as a substitute for the second product, among the two or more product repositories.

14. The method of claim 10, wherein the first recommendation for redistributing the product among the two or more product repositories comprises:
redistributing the product among a first plurality of product repositories assigned to a first cluster of product repositories; and
redistributing the product among a second plurality of product repositories assigned to a second cluster of product repositories;
(a) determining, based on redistributing the product among the first plurality of product repositories assigned to the first cluster of product repositories, that the first cluster has at least one excess product unit; and
(b) determining, based on redistributing the product among the second plurality of product repositories assigned to the second cluster of product repositories, that the second cluster has a product shortage of at least one product unit,
wherein the first recommendation further comprises:
based on (a) and (b), transferring the at least one excess product unit from the first cluster of product repositories to the second cluster of product repositories.

15. The method of claim 10, further comprising:
obtaining a product shortage window defining a particular period of time;
predicting product supply and demand values for the two or more product repositories over a period of time including the product shortage window;
based on the predicted product supply and demand values:
predicting product shortage values for the two or more product repositories at a particular time associated with an end of a product shortage window; and
applying the trained machine learning model to the inventory data to generate a particular recommendation for redistributing the product among the two or more product repositories.

16. A system comprising:
one or more processors; and
memory storing instructions that, when executed by the one or more processors, cause the system to perform operations comprising:
obtaining training data of sets of historical product redistribution data, a set of historical product redistribution data comprising:
a set of redistribution characteristics comprising:
a time to redistribute a product between two or more product repositories;
a cost to redistribute the product between the two or more product repositories; and
a score for the set of historical product redistribution data, wherein the score represents at least one of:
a profitability of the historical product redistribution data;
a vendor satisfaction level;
a customer satisfaction level;
an effectiveness of the historical product redistribution data at meeting product demand; and
an effectiveness of the historical product redistribution data at keeping inventory levels within a threshold range;
wherein the set of redistribution characteristics further comprises at least one of:
a reliability of an estimate for the time or the cost to redistribute the product between the two or more product repositories;
a rate of reduction of supply of the product from the two or more product repositories; and an interval of resupply of the product to the two or more product repositories;

training a machine learning model based on the training data set to generate recommendations for redistributing the product among the two or more product repositories;

obtaining inventory data for inventory of the product at, at least a subset of the two or more product repositories; and applying the trained machine learning model to the inventory data to generate a first recommendation for redistributing the product among the two or more product repositories, wherein the two or more product repositories correspond to product repositories within a first cluster of a plurality of clusters, and wherein the operations further comprise:
  obtaining a plurality of sets of inventory data for a plurality of sets of product repositories corresponding to the plurality of clusters, wherein applying the trained machine learning model to the inventory data includes applying the trained machine learning model to a first set of inventory data corresponding to a first set of product repositories of the first cluster among the plurality of clusters to generate the first recommendation for redistributing the product among the first set of product repositories;
  applying the trained machine learning model to a second set of inventory data corresponding to a second set of product repositories of a second cluster among the plurality of clusters to generate a second recommendation for redistributing the product among the second set of product repositories;
  determining a third set of inventory data corresponding to the first cluster based on applying the first recommendation to the first cluster;
  determining a fourth set of inventory data corresponding to the second cluster based on applying the second recommendation to the second cluster; and
  applying the trained machine learning model to a fifth set of inventory data, including the third set of inventory data and the fourth set of inventory data, to generate a third recommendation for redistributing the product among the plurality of clusters.

17. The system of claim 16, wherein the two or more product repositories correspond to product repositories across multiple clusters of a plurality of clusters.

18. The system of claim 16, wherein applying the trained machine learning model to the inventory data further comprises applying the machine learning model to a distribution constraint.

19. The system of claim 16, wherein the operation further comprise:
  obtaining second inventory data for inventory of a second product at, at least a second subset of the two or more product repositories; and
  applying the trained machine learning model to the second inventory data to generate a second recommendation for redistributing a third product, as a substitute for the second product, among the two or more product repositories.

20. The system of claim 16, wherein the operations further comprise:
  obtaining a product shortage window defining a particular period of time;
  predicting product supply and demand values for the two or more product repositories over a period of time including the product shortage window;
  based on the predicted product supply and demand values: predicting product shortage values for the two or more product repositories at a particular time associated with an end of a product shortage window; and
  applying the trained machine learning model to the inventory data to generate a particular recommendation for redistributing the product among the two or more product repositories.

* * * * *